United States Patent Office 3,397,074
Patented Aug. 13, 1968

3,397,074
PRINTING ON POLYSTYRENE
Bohdan V. Burachinsky, Maplewood, N.J., and Yuash P. Jacob, Chicago, Ill., assignors to Interchemical Corporation, New York, N.Y., a corporation of Ohio
No Drawing. Filed Feb. 11, 1965, Ser. No. 432,009
7 Claims. (Cl. 117—38)

ABSTRACT OF THE DISCLOSURE

Method of printing on curved polystyrene surfaces using a typographic press to apply to the surface an ink comprising coloring matter in a vehicle of a copolymer of allyl alcohol and styrene dissolved in a solvent selected from the group of glycols and glycol ethers having a solubility parameter of from 8.8 to 10.0.

---

This invention relates to printing on polystyrene. More particularly, it relates to printing on curved polystyrene surfaces such as the side walls of cylindrical or conical containers used for food.

In recent years, polystyrene containers for foods such as dairy products, salads and coffee have come into widespread use as replacements for paper containers which have been conventionally used for such products. Because of the great importance of printing in food merchandising, there has naturally arisen a concurrent demand for a method of printing on such food containers.

Printing on polystyrene, particularly the development of a commercially feasible method of printing on the curved sidewalls of the polystyrene containers has presented a heretofore unsolved problem to the printing art. All printing methods which employ inks containing significant amounts of hydrocarbon solvents are ruled out because the hydrocarbons attack the polystyrene surface resulting in ineffectual printing, poor adhesion and deterioration of the rigidity and strength of the polystyrene. Such inks also lack the grease resistance required in inks for food containers. On the other hand, flexographic methods of printing which employ solvents containing substantial amounts of alcohol have been found to be too crude for printing on the curved polystyrene surfaces. They produce printing which is too lacking in sharpness and too subject to distortion to be commercially desirable. While such flexographic methods have achieved a degree of acceptance for container tops and bottoms which are printed flat, their printing lacks the required fidelity on curved sidewalls.

Printing methods employing inks having predominantly vegetable oil vehicles such as linseed oils have been tried in lithographic methods of printing on polystyrene. However such inks are relatively very slow in drying and clearly not acceptable for commercial printing operations wherein the containers are nested within each other immediately after printing. The oil inks would still be wet at this stage resulting in set-off of the ink from one container to another as well as smearing of the ink.

Other and more unusual methods of printing on polystyrene have also been considered. For example, the alcohol based flexographic inks have been found to be too fast in evaporation rate to be used in the conventional typographic press systems for printing on curved surfaces. The inks dry up on the press before they can be applied. Also, ink based upon combined alcohol/glycol solvents have been considered. However, no such ink could be found which had a binder having adhesion to polystyrene. This serves to illustrate another aspect of the problem which is that resins having the requisite adhesion to polystyrene for a binder are very limited.

We have now found a novel method of printing on curved polystyrene surfaces which provides printed matter having excellent adhesion, excellent gloss, good scuff resistance, excellent moisture and detergent resistance as well as wide resistance to the varied food products which are to be packaged in the polystyrene containers.

The method involves using a typographic press to apply to the surface an ink comprising coloring matter in a vehicle comprising a copolymer of allyl alcohol and styrene dissolved in a solvent selected from the group consisting of glycols and glycol ethers having a solubility parameter of from 8.8 to 10.0.

The copolymer of allyl alcohol and styrene preferably is a low molecular weight copolymer prepared from an approximately equimolar mixture of the two monomers. The molecular weight of the copolymers is preferably within the range of 500 to about 2500. Where styrene and allyl alcohol are reacted, the copolymer has the structure

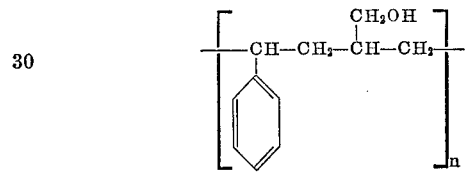

where $n$ most preferably has a value of from 4 to 10.

The styrene monomer may be styrene itself and usually is, or it may be any of the various substituted styrenes such as monochlorostyrene, alkyl-substituted styrene, and alpha-substituted styrene in which the substituent is an alkyl group, preferably methyl. Also while the alcohol is preferably allyl alcohol, other alcohols having a polymerizable $CH_2=C<$ group may be substituted, e.g., methallyl alcohol, allylcarbinol, beta-allyl-ethyl alcohol, methyl-allyl carbinol and methyl vinyl carbinol.

As previously set forth, the solvent may be either a glycol or glycol ether having a solubility parameter of from 8.8 to 10.0. The "solubility parameter" of solvents is defined in two articles: "A Solvent Formulating Chart" by Harry Burrel appearing in the November 1957 issue of "Official Digest" published by "The Federation of Paint and Varnish Production Clubs" and "Solubility Parameters For Film Formers" by Harry Burrell appearing in the October 1955 issue of said "Official Digest" pages 726 to 758.

The solubility parameter, S.P., is calculated by the following formula:

$$S.P. = \sqrt{\frac{(\text{Energy of Vaporization}) \times (\text{Density})}{\text{Molecular Weight}}}$$

Energy of Vaporization (at 25° C.) = 23.7 $T_b$ + 0.020 $T_b^2$ − 3350, where $T_b$ = boiling point of the solvent in °K at atmospheric pressure.

Correction factors:
 For alcohols add 1.4 to calculated S.P.
 For esters add 0.6 to calculated S.P.
 For ketones boiling under 100° C. add 0.5 to calculated S.P.

For other compounds, no correction factor is necessary.

The following are typical glycols and glycol ethers having solubility parameters which fall within the range of solvents which may be used in this invention:

| | |
|---|---|
| Hexylene glycol | 9.7 |
| Octylene glycol | 9.4 |
| Dipropylene glycol | 10.0 |
| Diethylene glycol | 9.1 |
| Ethylene glycol monoethyl ether | 9.9 |
| Ethylene glycol monobutyl ether | 8.9 |
| Diethylene glycol monoethyl ether | 9.6 |
| Diethylene glycol monobutyl ether | 8.9 |
| Diethylene glycol monobutyl ether acetate | 8.9 |
| Ethylene glycol monomethyl ether acetate | 9.2 |

Where solvent mixtures are used, the mixture will have a solubility parameter in proportion of the volume fraction of the components present. When a mixture is used, the resulting solubility parameter still preferably falls within the range 8.8 to 10.0.

The term glycol ether as used in this specification is meant to include esters of glycol ethers such as diethylene glycol monobutyl ether acetate and ethylene glycol monoethyl ether acetate.

Poly epoxy resins may be included in the inks used in the method of this invention. It appears that the epoxy resins increase the toughness of the films to a certain extent.

Preferably, the polyepoxides used in this invention are resins produced by the reaction of a polyglycidyl ether of polyhydric phenol having more than one epoxy group, particularly 2,2-bis(4-hydroxyphenyl) propane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of 2,2-bis(4-hydroxyphenyl) propane, a higher weight polyepoxide resin may be produced.

Unless otherwise set forth, all proportions in this specification and claims are by weight. The binder whether it be the allyl alcohol/styrene copolymer alone or together with an epoxy resin and the solvent are present in amounts conventional to inks, e.g., in the order of from 1.0 to 1.5 parts of solvent per part of binder. When the epoxy resin is used from 0.1 to 0.3 parts of epoxy resin are preferably present for each part of the copolymer.

The coloring matter is preferably in pigment form and may be any of the conventional coloring matter used in printing inks and is used in conventional proportions.

The ink may contain any of the conventional additives to printing inks such as dispersing agents and waxes. For example, in the present method of printing, when the containers are nested within each other after printing, there is often a tendency of the nested surfaces to abrade against each other. This tendency may be reduced by the incorporation of a small amount of wax into the ink. The wax may be any of the conventional waxes used in printing inks such as microcrystalline wax and carnauba wax. Preferably a polyethylene wax is used. For the same purpose, other release agents may be included in the ink formula.

It will be obvious to those skilled in the art that while this invention has been described with respect to printing on curved polystyrene surfaces, it will also function for printing on flat polystyrene surfaces. However the primary advantage lies in printing on curved polystyrene surfaces.

The following examples will further illustrate the practice of this invention:

EXAMPLE 1

The following ingredients are mixed together to form an ink:

| | Parts by weight |
|---|---|
| Shell X450 (copolymer of equimolar proportions of allyl alcohol and styrene, having an average molecular weight of 1150) | 340 |
| Phthalocyanine blue pigment | 200 |
| Hexylene glycol (2-methylpentanediol-2,4), solubility parameter 9.7 | 380 |
| Polyethylene wax having a molecular weight of 1000 | 70 |
| Silicone L-45 (fluid dimethyl polysiloxane release agent) | 10 |

Using a conventional typographic technique for printing on curved surfaces, the above ink is printed upon the curved side walls of cylindrical polystyrene containers which are heated to 150–190° F. for at least 5 seconds after printing and then nested within each other for convenience in storing. The printing displays excellent adhesion to the polystyrene, and excellent gloss as well as good scuff resistance, moisture and detergent resistance and resistance to food products such as milk, cream, butter, cheese, sour cream and coffee, which may be packaged in these containers. The inks also display good stability and viscosity for the typographic press. The typographic press used may be either the direct type in which the raised letter printing plate applies the ink directly to the container walls or the indirect or offset typographic press wherein the ink is transferred from the printing plate to the container wall by means of an intermediate dry offset cylinder having a regular surface covered with a rubber blanket.

EXAMPLE 2

The following ingredients are mixed together to form an ink:

| | Parts by weight |
|---|---|
| Shell X450 | 237 |
| Epon 1001 (polyepoxide resin made by the condensation of 2,2-bis(4-hydroxyphenyl) propane and epichlorohydrin having an average molecular weight of about 1000 and an epoxide equivalent weight of 450–525) | 88 |
| Cyanine green pigment | 250 |
| Hexylene glycol | 318 |
| Polyethylene wax having a molecular weight of 10,000 | 65 |
| Diethylene glycol monobutyl ether acetate | 31 |

(Solubility parameter=8.9)

Used in typographic printing on the curved surface of a polystyrene container, the ink displays the same desirable properties as does the ink of Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. A method of printing on a curved polystyrene surface which comprises applying to said surface by a typographic press, an ink comprising coloring matter in a vehicle comprising a copolymer of allyl alcohol and styrene dissolved in a solvent selected from the group consisting of glycols and glycol ethers having a solubility parameter of from 8.8 to 10.0.

2. The method of printing of claim 1 wherein said copolymer has the structure

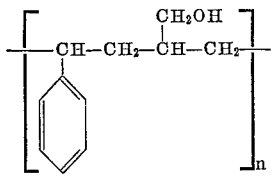

$n$ having a value of from 4 to 10.

3. The method of printing of claim 2 wherein said ink vehicle further includes a dissolved glycidyl polyether of a polyhydric phenol.

4. The method of claim 3 wherein said polyether is the reaction product of epichlorohydrin and 2,2-bis(4-hydroxyphenyl)propane.

5. The method of claim 2 wherein said solvent is hexylene glycol.

6. The method of claim 1 wherein the printing is done on the curved sidewalls of polystyrene containers.

7. The method of claim 3 wherein said solvent is a mixture of hexylene glycol and diethylene glycol monobutyl ether acetate.

References Cited

UNITED STATES PATENTS

| 2,375,230 | 5/1945 | Kline | 106—22 |
| 2,894,938 | 7/1959 | Chapin et al. | 260—88.1 |
| 3,028,349 | 4/1962 | Rowland et al. | 260—33.4 X |
| 3,043,787 | 7/1962 | Bonvicini et al. | 117—38 X |
| 3,232,789 | 2/1966 | Pelzek et al. | 117—138.8 |

FOREIGN PATENTS 803,647  10/1958  Great Britain.

OTHER REFERENCES

The Condensed Chemical Dictionary, 6th edition (1961), Reinhold Publishing Corporation, New York, p. 376.

ALFRED L. LEAVITT, *Primary Examiner.*

R. L. BROWDY, *Assistant Examiner.*